(12) United States Patent
Tepesch et al.

(10) Patent No.: US 8,138,108 B2
(45) Date of Patent: Mar. 20, 2012

(54) ALUMINUM TITANATE-CONTAINING CERAMIC-FORMING BATCH MATERIALS AND METHODS USING THE SAME

(75) Inventors: Patrick David Tepesch, Corning, NY (US); Christopher John Warren, Waverly, NY (US)

(73) Assignee: Corning Incorporated, Corning, NY (US)

( * ) Notice: Subject to any disclaimer, the term of this patent is extended or adjusted under 35 U.S.C. 154(b) by 336 days.

(21) Appl. No.: 12/394,956

(22) Filed: Feb. 27, 2009

(65) Prior Publication Data

US 2010/0222200 A1    Sep. 2, 2010

(51) Int. Cl.
| | |
|---|---|
| C04B 38/00 | (2006.01) |
| C04B 38/06 | (2006.01) |
| C04B 35/00 | (2006.01) |
| B01D 39/06 | (2006.01) |

(52) U.S. Cl. ............ 501/80; 501/81; 501/82; 501/83; 501/134; 55/523

(58) Field of Classification Search ............ 501/80, 501/81, 82, 83, 85, 134, 99, 100; 55/523, 55/522, 524; 502/439
See application file for complete search history.

(56) References Cited

U.S. PATENT DOCUMENTS

| | | | |
|---|---|---|---|
| 6,620,751 B1 | 9/2003 | Ogunwumi | |
| 6,849,181 B2 | 2/2005 | Ogunwumi et al. | |
| 6,942,713 B2 | 9/2005 | Ogunwumi et al. | |
| 7,001,861 B2 | 2/2006 | Beall et al. | |
| 7,259,120 B2 | 8/2007 | Ellison et al. | |
| 7,288,131 B2 | 10/2007 | Noguchi et al. | |
| 7,294,164 B2 * | 11/2007 | Merkel | 55/523 |
| 7,442,663 B2 | 10/2008 | Tomita | |
| 2003/0041574 A1 * | 3/2003 | Noguchi et al. | 55/523 |
| 2004/0020846 A1 | 2/2004 | Ogunwumi et al. | |
| 2006/0021308 A1 | 2/2006 | Merkel | |
| 2006/0021309 A1 | 2/2006 | Merkel | |
| 2007/0006561 A1 * | 1/2007 | Brady et al. | 55/523 |
| 2007/0119135 A1 * | 5/2007 | Miao et al. | 55/523 |
| 2007/0214759 A1 | 9/2007 | Merkel | |
| 2008/0125305 A1 | 5/2008 | Day et al. | 501/80 |
| 2008/0300127 A1 | 12/2008 | Tennent et al. | 501/80 |

FOREIGN PATENT DOCUMENTS

| | | |
|---|---|---|
| WO | 2006/130759 | 12/2006 |
| WO | 2006/130759 A2 | 12/2006 |
| WO | 2009/076985 | 6/2009 |

* cited by examiner

*Primary Examiner* — Jerry Lorengo
*Assistant Examiner* — Noah Wiese
(74) *Attorney, Agent, or Firm* — Matthew B. McNutt; Joseph M. Homa

(57) ABSTRACT

The present disclosure relates to aluminum titanate-containing ceramic-forming batch materials and methods using the same.

19 Claims, 1 Drawing Sheet

ALUMINUM TITANATE-CONTAINING CERAMIC-FORMING BATCH MATERIALS AND METHODS USING THE SAME

FIELD OF THE DISCLOSURE

The present disclosure relates to aluminum titanate-containing ceramic-forming batch materials and methods using the same.

BACKGROUND

Aluminum titanate-containing ceramic bodies have emerged as viable substrates to support catalytically-active components for catalytic converters on automobiles, particularly the severe conditions in diesel filter applications. Among the many pollutants in the exhaust gases filtered in these applications are hydrocarbons and oxygen-containing compounds, the latter including nitrogen oxides (NOx) and carbon monoxide (CO). Aluminum titanate-containing ceramic bodies exhibit high thermal shock resistance, enabling them to endure the wide temperature variations encountered in their application, and they also exhibit other advantageous properties for diesel particulate filter applications, such as high porosity, low coefficient of thermal expansion (CTE), resistance to ash reaction, and modulus of rupture (MOR) adequate for the intended application.

With engine management schemes becoming more and more sophisticated, and with catalyst compositions ever changing, there exists a need for the ability to vary or tailor the properties of these aluminum titanate-containing ceramic bodies, for example their pore size, porosity, and pore size distribution (i.e., a low d-factor). Moreover, there is a need for a method to make aluminum titanate-containing ceramic bodies having these desirable properties.

SUMMARY

In accordance with the detailed description and various exemplary embodiments described herein, the present disclosure relates to novel aluminum titanate-containing ceramic-forming batch materials comprising inorganic materials and at least one pore-forming material. In various exemplary embodiments, the ratio of the median particle diameter of at least 40 volume % of the inorganic materials to the median particle diameter of the at least one pore-forming material ranges from 0.3 to 1.0. In further embodiments, the particle size distributions ("$d_{breadth}$") for the at least 40 volume % of the inorganic materials is less than 1.5 and/or the $d_{breadth}$ of the at least one pore-forming material is less than 2.

The inventors have also discovered methods of making aluminum titanate-containing ceramic bodies using batch materials of the present disclosure, and methods for improving pore size distribution and/or controlling pore size of aluminum titanate-containing ceramic bodies using the batch materials of the present disclosure.

BRIEF DESCRIPTION OF THE DRAWINGS

The accompanying drawings are included to provide a further understanding of the invention, and are incorporated in and constitute a part of this specification. The drawings are not intended to be restrictive of the invention as claimed, but rather are provided to illustrate exemplary embodiments of the invention and, together with the description, serve to explain the principles of the invention.

DETAILED DESCRIPTION

Figure 1:
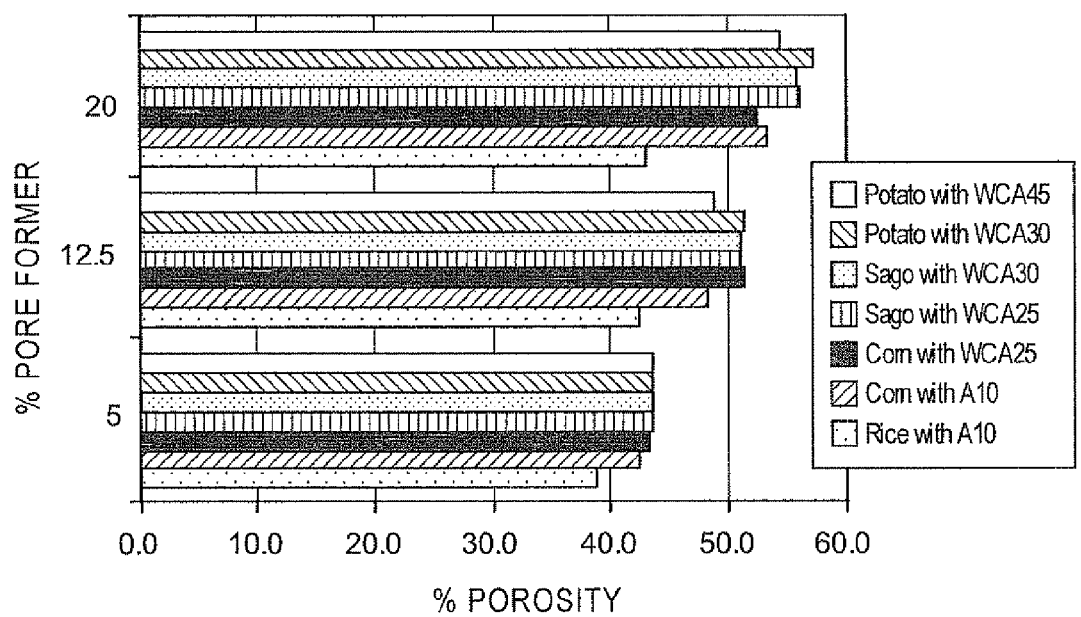
FIG. 1 is a graphical representation of the porosity of aluminum titanate-containing ceramic bodies made using the batch materials and methods described in Example 1 herein.

It is to be understood that both the foregoing general description and the following detailed description are exemplary and explanatory only and are not restrictive of the invention, as claimed. Other embodiments will be apparent to those skilled in the art from consideration of the specification and practice of the embodiments disclosed herein. It is intended that the specification and examples be considered as exemplary only, with the true scope and spirit of the invention being indicated by the claims.

The present disclosure relates to aluminum titanate-containing ceramic-forming batch materials comprising inorganic materials and at least one pore-forming material. In various exemplary embodiments, the ratio of the median particle diameter of at least 40 volume % of the inorganic materials to the median particle diameter of the at least one pore-forming material ranges from 0.3 to 1.0. In further embodiments, the particle size distributions ("$d_{breadth}$") for the at least 40 volume % of the inorganic materials is less than 1.5 and/or the $d_{breadth}$ of the at least one pore-forming material is less than 2.

The present disclosure also relates to methods of making aluminum titanate-containing ceramic bodies comprising, in part, preparing the batch materials of the present disclosure and preparing ceramic bodies from those batch materials.

The disclosure further relates to methods for improving pore size distribution and/or controlling pore size of aluminum titanate-containing ceramic bodies comprising, in part, preparing the batch materials of the present disclosure.

As used herein, "improving pore size distribution and/or controlling pore size of aluminum titanate-containing ceramic bodies" is intended to mean obtaining a ceramic body with an appropriate number of pores of similar sizes to be effective in a given application and/or obtaining a ceramic body with pores of a size appropriate to be effective in a given application.

As used herein, the term "batch material," and variations thereof, is intended to mean a substantially homogeneous mixture comprising (a) inorganic materials and (b) at least one pore-forming material. In various exemplary embodiments of the present disclosure, inorganic materials may be comprised of at least one source of alumina and at least one source of titania.

Sources of alumina include, but are not limited to, powders that when heated to a sufficiently high temperature in the absence of other raw materials, will yield substantially pure aluminum oxide. Examples of such alumina sources include alpha-alumina, a transition alumina such as gamma-alumina or rho-alumina, hydrated alumina, gibbsite, corundum ($Al_2O_3$), boehmite (AlO(OH)), pseudoboehmite, aluminum hydroxide ($Al(OH)_3$), aluminum oxyhydroxide, and mixtures thereof.

In various exemplary embodiments, the at least one alumina source may comprise at least 40 wt %, at least 45 wt %, or at least 50 wt % of the inorganic materials, such as, for example, 49 wt % of the inorganic materials.

In various exemplary embodiments, one of skill in the art may choose the at least one alumina source so that the median particle diameter of the at least one source of alumina ranges from 1 μm to 45 μm, for example from 2 to 25 μm.

In various exemplary embodiments, one of skill in the art may choose the at least one alumina source so that the $d_{breadth}$ for the at least one alumina source is less than 1.5, for example, less than 1.3 or less than 1. As used herein, $d_{breadth}=(d_{90}-d_{10})/d_{50}$, where $d_{90}$ represents the particle size that 90% of the particles are smaller than, $d_{10}$ represents the particle size that 10% of the particles are smaller than, and $d_{50}$ represents the particle size that 50% of the particles are smaller than.

In various exemplary embodiments of the present invention, the at least one source of alumina may be chosen from commercially available products, such as that sold under the designation A10 by Almatis, Inc. of Leetsdale, Pa., and those sold under the trade name Microgrit WCA20, WCA25, WCA30, WCA40, WCA45, and WCA50 by Micro Abrasives Corp. of Westfield, Mass.

Sources of titania include, but are not limited to, rutile, anatase, and amorphous titania. For example, in at least one embodiment, the at least one titania source may be that sold under the trade name Ti-Pure® R-101 by DuPont Titanium Technologies of Wilmington, Del.

In various exemplary embodiments, the at least one titania source may comprise at least 20 wt % of the inorganic materials, for example at least 25 wt % or at least 30 wt % of the inorganic materials.

In various embodiments of the present invention, the inorganic materials may further comprise at least one additional material. In at least one embodiment, the at least one additional material may be chosen from silica, oxides (e.g. lanthanum oxide), carbonates (e.g. calcium carbonate and strontium carbonate), nitrates, and hydroxides.

In one exemplary embodiment, the at least one additional material may be silica, which may further comprise at least 5 wt % of the inorganic materials, for example at least 8 wt % or at least 10 wt % of the inorganic materials.

Sources of silica include, but are not limited to, non-crystalline silica, such as fused silica or sol-gel silica, silicone resin, low-alumina substantially alkali-free zeolite, diatomaceous silica, kaolin, and crystalline silica, such as quartz or cristobalite. Additionally, the sources of silica may include silica-forming sources that comprise a compound that forms free silica when heated, for example, silicic acid or a silicon organometallic compound. For example, in at least one embodiment, the at least one silica source may be that sold under the trade name Cerasil 300 by Unimin of Troy Grove, Ill., or Imsil A25 by Unimin of Elco, Ill.

In various exemplary embodiments, the particles of the inorganic materials may be chosen so that they are substantially uniform in size. For example, in at least one embodiment, the $d_{breadth}$ for at least 40 volume % of the inorganic materials is less than 1.5, for example less than 1. In further embodiments, the $d_{breadth}$ for at least 50 volume % of the inorganic materials is less than 1.5, for example 1.

As used herein, the term "pore-forming material," and variations thereof, means organic materials selected from the group of: carbon (e.g., graphite, activated carbon, petroleum coke, and carbon black), starch (e.g., corn, barley, bean, potato, rice, tapioca, pea, sago palm, wheat, canna, and walnut shell flour), and polymers (e.g., polybutylene, polymethylpentene, polyethylene (preferably beads), polypropylene (preferably beads), polystyrene, polyamides (nylons), epoxies, ABS, Acrylics, and polyesters (PET)). In at least one embodiment, the at least on pore-forming material is a starch chosen from rice, corn, sago palm and potato. In at least one embodiment, the at least one pore-forming material is not graphite.

In various exemplary embodiments, the batch material is comprised of at least one pore-forming material; in further embodiments, the batch material is comprised of at least two pore-forming materials, such as at least three pore-forming materials. For example, a combination of a polymer and graphite may be used, or a combination of starch and graphite, or a combination of a polymer and a starch.

In various exemplary embodiments, one of skill in the art may choose the at least one pore-forming material so that the median particle diameter of the at least one pore-forming material may range from 1 μm to 200 μm, such as, for example, from 5 μm to 100 μm, or from 5 μm to 50 μm.

In various exemplary embodiments, the at least one pore-forming material may be present in any amount to achieve a desired result. For example, the at least one pore-forming material may comprise at least 1 wt % of the batch material, added as a super-addition (i.e., the inorganic materials comprise 100% of the batch material, such that the total batch material is 101%). For example, the at least one pore-forming material may comprise at least 5 wt %, at least 12.5 wt %, at least 15 wt %, at least 18 wt %, or at least 20 wt % of the batch material added as a super-addition.

In various exemplary embodiments, the particles of the at least one pore-forming material may be chosen so that they are substantially uniform in size. For example, in at least one embodiment, the $d_{breadth}$ of the at least one pore-forming material is less than 2, for example less than 1.5.

In various exemplary embodiments of the present invention, one of skill in the art may choose the inorganic materials and at least one pore-forming material in order to arrive at a particular ratio of the median particle diameter of at least 40 volume % of the inorganic materials to the median particle diameter of the at least one pore-forming material. By way of example, the ratio of the median particle diameter of at least 40 volume % of the inorganic materials to the median particle diameter of the at least one pore-forming material may range from 0.1 to 1.7, such as, for example, from 0.3 to 1.0, or from 0.5 to 0.8. In further embodiments, the ratio of the median particle diameter of at least 45 volume %, such as, for example, at least 50 volume %, of the inorganic materials to the median particle diameter of the at least one pore-forming material may range from 0.1 to 1.7, such as, for example, from 0.3 to 1.0, or from 0.5 to 0.8.

The batch material may be made by any method known to those of skill in the art. By way of example, in at least one embodiment, the inorganic materials may be combined as powdered materials and intimately mixed to form a substantially homogeneous mixture. The at least one pore-forming material may be added to form a batch mixture before or after the inorganic materials are intimately mixed. In that exemplary embodiment, the at least one pore-forming material and inorganic materials may then be intimately mixed to form a substantially homogeneous batch material. It is within the ability of one of skill in the art to determine the appropriate steps and conditions for combing the inorganic materials and at least one pore-forming material to achieve a substantially homogeneous batch material.

In additional exemplary embodiments, batch material may be mixed with any other known component useful for making batch material. For example, a binder, such as an organic binder, and/or a solvent may be added to the batch material to form a plasticized mixture. In such an embodiment, it is within the ability of one skilled in the art to select an appropriate binder. By way of example only, an organic binder may chosen from cellulose-containing components, for example, methylcellulose, methylcellulose derivatives and combinations thereof, may be used. In at least one embodiment of the present invention, the organic binder is a methylcellulose sold under the trade name Methocel® by the Dow Chemical Company of Midland, Mich., may be used.

It is also within the ability of one skilled in the art to select an appropriate solvent, if desired. In various exemplary embodiments, the solvent may be water, for example deionized water.

The additional component, such as organic binder and solvent, may be mixed with the batch material individually, in any order, or together to form a substantially homogeneous mixture. It is within the ability of one of skill in the art to determine the appropriate conditions for mixing the batch material with the organic binder and solvent to achieve a substantially homogeneous material. For example, the components may be mixed by a kneading process to form a substantially homogeneous mixture.

The mixture may, in various embodiments, be shaped into a ceramic body by any process known to those of skill in the art. By way of example, the mixture may be injection molded or extruded and optionally dried by conventional methods known to those of skill in the art to form a green body. In various exemplary embodiments, the green body may then be fired to form an aluminum titanate-containing ceramic body.

It is within the ability of one skilled in the art to determine the appropriate method and conditions for forming a ceramic body, such as, for example, firing conditions including equipment, temperature and duration, to achieve an aluminum titanate-containing ceramic body, depending in part upon the size and composition of the green body. Non-limiting examples of firing cycles for aluminum titanate-containing ceramic bodies can be found in International Publication No. WO 2006/130759, which is incorporated herein by reference. For example, the composition of the batch material may allow for shorter drying and firing times than used for conventional batch materials, and in a further embodiment, this may result in the ability to easily make large ceramic bodies as well.

In at least one embodiment of the present invention, the particle size, particle size distribution, and amount of inorganic materials and at least one pore-forming material may be selected to improve the pore size distribution and/or control the pore size of the resulting aluminum titanate-containing ceramic body. By carefully selecting the combinations of these materials, one may tailor the microstructure of an aluminum titanate-containing ceramic body to give a desired pore size and/or pore size distribution and/or porosity. For example, in at least one embodiment, the production of an aluminum titanate-containing ceramic body having a small median pore size, e.g., less than about 13 μm, and narrow pore-size distributions, e.g., a d-factor of less than 0.3, may improve filtration efficiency of the ceramic body. In yet a further embodiment, the production of an aluminum titanate-containing ceramic body having a large median pore size, e.g, larger than about 13 μm, and narrow pore-size distributions, e.g., a d-factor of less than 0.3, may allow flexibility for washcoat loadings, for example loading of large particles, large agglomerates, or large amounts. As used herein, the term "d-factor" refers to pore-size distribution, and is defined as $(d_{50}-d_{10})/d_{50}$.

In various embodiments of the present disclosure, the components of the batch material may be chosen so that aluminum titanate-containing ceramic bodies made therefrom have median pore sizes ranging from 5 μm to 35 μm, such as, for example, ranging from 7 μm to 32 μm.

In further embodiments of the present disclosure, the components of the batch material may be chosen so that aluminum titanate-containing ceramic bodies made therefrom have porosities ranging from 30% to 65%, for example ranging from 35% to 60% or from 40% to 55%.

In further embodiments of the present disclosure, the components of the batch material may be chosen so that aluminum titanate-containing ceramic bodies made therefrom have pore size d-factors ranging from 0.1 to 0.55, for example ranging from 0.2 to 0.5 or from 0.3 to 0.45.

In various embodiments of the present disclosure, the aluminum titanate-containing ceramic bodies may have modulus of rupture (MOR) on cellular ware (e.g., 300 cells per square inch (cpsi)/13 mil web thickness) of 200 psi or greater, for example of 300 psi or greater.

Unless otherwise indicated, all numbers used in the specification and claims are to be understood as being modified in all instances by the term "about," whether or not so stated. It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

As used herein the use of "the," "a," or "an" means "at least one," and should not be limited to "only one" unless explicitly indicated to the contrary. Thus, for example, the use of "the batch material" or "batch material" is intended to mean at least one batch material.

Other embodiments of the invention will be apparent to those skilled in the art from consideration of the specification and practice of the invention disclosed herein. It is intended that the specification and examples be considered as exemplary only, with a true scope and spirit of the invention being indicated by the claims.

EXAMPLES

The following examples are not intended to be limiting of the invention as claimed.

Example 1

Twenty-one batches were prepared using 4 different alumina materials (A10, WCA25, WCA30 and WCA45) in combination with 4 different pore formers (rice starch, corn starch, sago starch and potato starch). Table 1 below sets out the type and amounts of alumina materials and pore-forming material in each batch.

The alumina materials set forth in Table 1 were combined with the other inorganic materials in powder form, 30.284 wt % titanium dioxide (R101), 10.311 wt % silicone dioxide (Cerasil 300), 8.093 wt % strontium carbonate, 1.352 wt % calcium carbonate, and 0.193 wt % lanthanum oxide, in each batch. The pore-forming materials set forth in Table 1 were then added to the inorganic batch and intimately mixed to produce a substantially homogeneous mixture. The particle size data for the alumina, silica, and pore-forming materials comprising these batches are set forth in Table 9 below.

Methocel, which comprises 4.5 wt % of the mixture as a super-addition, was added as a powder to the batch material.

Then water, which comprises 16 wt % of the mixture as a super-addition, was added, and the mixture kneaded to form a plasticized mixture.

The plasticized mixtures were extruded to make cellular ware (e.g., 300 cells per square inch (cpsi)/13 mil web thickness), and the resulting green body was fired on a standard alumina titanate firing schedule as described in International Publication No. WO 2006/130759, which is incorporated herein by reference.

TABLE 1

Composition of Batches 1-21

| Batch No. | Alumina (wt % of inorganic material) | | | | Starch (wt % of batch material) | | | |
|---|---|---|---|---|---|---|---|---|
| | A10 | WCA25 | WCA30 | WCA45 | Rice | Corn | Sago | Potato |
| 1 | 49.767 | — | — | — | 5 | — | — | — |
| 2 | 49.767 | — | — | — | 12.5 | — | — | — |
| 3 | 49.767 | — | — | — | 20 | — | — | — |
| 4 | 49.767 | — | — | — | — | 5 | — | — |
| 5 | 49.767 | — | — | — | — | 12.5 | — | — |
| 6 | 49.767 | — | — | — | — | 20 | — | — |
| 7 | — | 49.767 | — | — | — | 5 | — | — |
| 8 | — | 49.767 | — | — | — | 12.5 | — | — |
| 9 | — | 49.767 | — | — | — | 20 | — | — |
| 10 | — | 49.767 | — | — | — | — | 5 | — |
| 11 | — | 49.767 | — | — | — | — | 12.5 | — |
| 12 | — | 49.767 | — | — | — | — | 20 | — |
| 13 | — | — | 49.767 | — | — | — | 5 | — |
| 14 | — | — | 49.767 | — | — | — | 12.5 | — |
| 15 | — | — | 49.767 | — | — | — | 20 | — |
| 16 | — | — | 49.767 | — | — | — | — | 5 |
| 17 | — | — | 49.767 | — | — | — | — | 12.5 |
| 18 | — | — | 49.767 | — | — | — | — | 20 |
| 19 | — | — | — | 49.767 | — | — | — | 5 |
| 20 | — | — | — | 49.767 | — | — | — | 12.5 |
| 21 | — | — | — | 49.767 | — | — | — | 20 |

Figure 2:
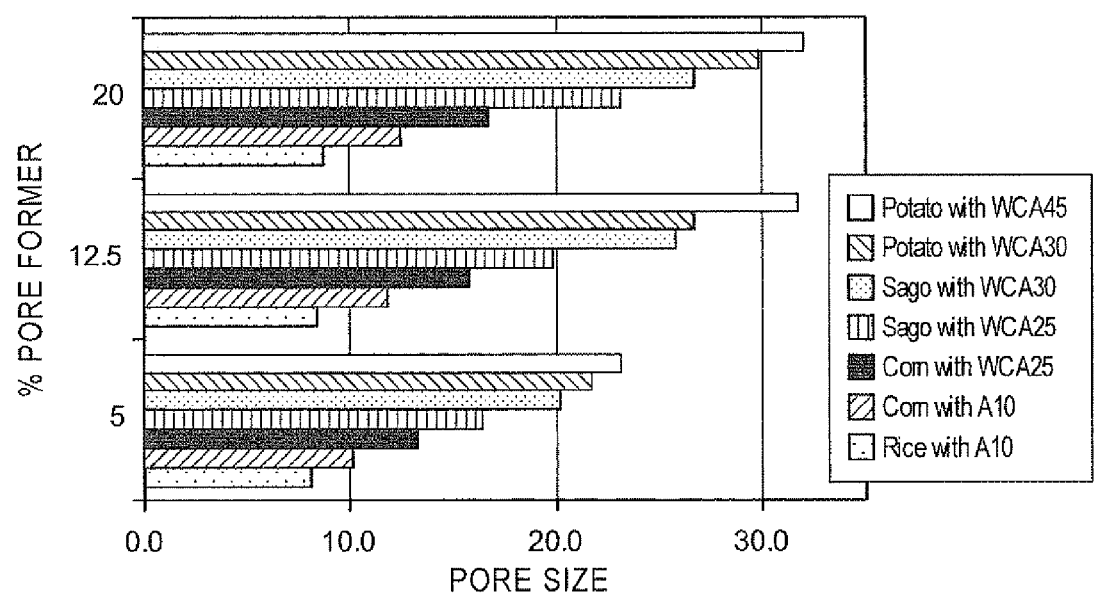
FIG. 2 is a graphical representation of the pore size of aluminum titanate-containing ceramic bodies made using the batch materials and methods described in Example 1 herein.

The resulting alumina titanate-containing ceramic bodies were analyzed. Their properties are set forth in Table 2. Moreover, the batches were also plotted as a function porosity and pore size, which appear as FIGS. 1 and 2 respectively. FIG. 1 is a graphical representation of the porosity of aluminum titanate-containing ceramic bodies, with the X-axis representing % porosity, and the Y-axis representing % pore former. FIG. 2 is a graphical representation of the pore size of aluminum titanate-containing ceramic bodies, with the X-axis representing pore size in μm, and the Y-axis representing % pore former.

As can be seen in these figures and data, the choice and amount of alumina source and pore-forming material may affect the overall porosity of the ceramic body, the median pore size, and the pore size distribution (d-factor) as well.

TABLE 2

Properties of Fired Articles Resulting from Batches 1-21

| Batch No. | Porosity (%) | Pore Size (μm) | d10 | d90 | (d50 − d10)/d50 | CTE (800) | CTE (1000) | MOR (psi) |
|---|---|---|---|---|---|---|---|---|
| 1 | 38.61 | 8.22 | 4.79 | 17.47 | 0.42 | — | — | — |
| 2 | 42.15 | 8.49 | 5.34 | 17.79 | 0.37 | — | — | — |
| 3 | 42.74 | 8.83 | 5.59 | 19.72 | 0.37 | — | — | — |
| 4 | 42.22 | 10.14 | 6.11 | 16.32 | 0.40 | 2.1 | 6.2 | — |
| 5 | 48.23 | 11.87 | 8.34 | 18.46 | 0.30 | — | — | — |
| 6 | 53.31 | 12.56 | 9.06 | 19.58 | 0.28 | 6.5 | 10.4 | — |
| 7 | 43.04 | 13.36 | 8.17 | 23.61 | 0.39 | −1.9 | 2.2 | — |
| 8 | 51.10 | 15.78 | 10.26 | 24.82 | 0.35 | — | — | — |
| 9 | 52.40 | 16.79 | 11.07 | 28.64 | 0.34 | — | — | — |
| 10 | 43.52 | 16.45 | 8.85 | 29.45 | 0.46 | — | — | — |
| 11 | 51.07 | 19.96 | 13.97 | 29.50 | 0.30 | — | — | — |
| 12 | 56.03 | 23.19 | 17.18 | 34.18 | 0.26 | — | — | — |
| 13 | 43.50 | 20.16 | 12.35 | 36.26 | 0.39 | — | — | — |
| 14 | 50.91 | 25.85 | 18.46 | 39.10 | 0.29 | — | — | — |
| 15 | 55.85 | 26.76 | 19.39 | 39.96 | 0.28 | 2.6 | 6.6 | — |
| 16 | 43.51 | 21.76 | 12.84 | 43.29 | 0.41 | −1.9 | 1.3 | — |
| 17 | 51.22 | 26.81 | 16.79 | 46.78 | 0.37 | −1.2 | 3.0 | — |
| 18 | 57.09 | 29.85 | 20.08 | 49.04 | 0.33 | −0.3 | 3.8 | — |
| 19 | 43.44 | 23.1 | 13.13 | 46.27 | 0.43 | −0.9 | 3.1 | — |
| 20 | 48.58 | 31.76 | 21.70 | 57.55 | 0.32 | −0.5 | 3.1 | 72 |
| 21 | 54.26 | 32.11 | 21.10 | 54.86 | 0.34 | 1.0 | 4.9 | — |

Example 2

Batches 22-25 were made using the same procedure set forth in Example 1, but for the alumina source and pore-forming materials, which are set forth in Table 3 below. The particle size data for the alumina, silica, and pore-forming materials comprising these batches are set forth in Table 9 below.

TABLE 3

Composition of Batches 22-25

| Batch No. | Alumina (wt % of inorganic material) WCA20 | Starch (wt % of batch material) Corn Starch | Graphite 4623 |
|---|---|---|---|
| 22 | 49.767 | 10 | |
| 23 | 49.767 | 20 | |
| 24 | 49.767 | | 15 |
| 25 | 49.767 | | 30 |

The resulting alumina titanate-containing ceramic bodies were analyzed. Their properties are set forth in Table 4.

TABLE 4

Properties of Fired Articles Resulting from Batches 22-25

| Batch No. | Porosity (%) | d10 | d50 | d90 | (d50 − d10)/ d50 | CTE 800/1000 |
|---|---|---|---|---|---|---|
| 22 | 49.60 | 7.80 | 11.60 | 14.60 | 0.33 | 9/12.8 |
| 23 | 57.40 | 10.20 | 14.00 | 17.60 | 0.27 | 14.6/17.9 |
| 24 | 49.50 | 6.30 | 12.30 | 19.80 | 0.49 | 12/15.7 |
| 25 | 56.70 | 9.4 | 15.30 | 21.60 | 0.39 | 9.4/12.8 |

Comparative Example 1

Four comparative batches were prepared using the alumina and silica sources set forth in Table 5. Specifically, the alumina source accounted for 49.767 wt % of total inorganic batch materials, and the silica source accounted for 10.311 wt % of total inorganic batch materials. No pore-forming materials were used. The alumina and silica materials were combined with other inorganic materials in powder form, 30.284 wt % titanium dioxide (R101), 8.093 wt % strontium carbonate, 1.352 wt % calcium carbonate, and 0.193 wt % lanthanum oxide, in each case. The materials were intimately mixed to produce a substantially homogeneous mixture. The particle size data for the alumina and silica materials comprising these batches are set forth in Table 9 below.

The organic binder, 4.5 wt % of methocel, was mixed in powder form with the batch material. Water was added, and the mixture kneaded to form a plasticized mixture.

The plasticized mixtures were extruded and the resulting green body was fired on a standard alumina titanate firing schedule.

TABLE 5

Composition of Batches C1-C4

| Batch No. | Alumina Source | Silica Source |
|---|---|---|
| C1 | WCA 20 | Imsil A25 |
| C2 | WCA 25 | Imsil A25 |
| C3 | A10 | Imsil A25 |
| C4 | A10 | Cerasil 300 |

The resulting alumina titanate-containing ceramic bodies were analyzed. Their properties are set forth in Table 6.

TABLE 6

Properties of Fired Articles Resulting from Batches C1-C4

| Batch No. | Porosity (%) | d10 | d50 | d90 | (d50 − d10)/ d50 | CTE 800/1000 |
|---|---|---|---|---|---|---|
| C1 | 30.98 | 3.40 | 6.13 | 8.60 | 0.44 | 2.4/6.4 |
| C2 | 31.92 | 4.50 | 8.04 | 9.90 | 0.44 | 1.4/5.2 |
| C3 | 31.76 | 3.80 | 6.33 | 9.40 | 0.40 | 3.6/11.3 |
| C4 | 30.16 | 1.20 | 7.79 | 20.10 | 0.84 | −0.1/4.5 |

Comparative Example 2

Four comparative batches were prepared using the alumina sources set forth in Table 7 and the remaining inorganic materials identified in Example 1, and using the amounts specified therein. Specifically, the alumina source accounted for 49.767 wt % of total inorganic batch materials. The particle size data for the alumina and silica materials comprising these batches are set forth in Table 9 below. The procedure set forth in Example 1 was followed, but for no pore-forming materials were used.

TABLE 7

Composition of Batches C5-C8

| Batch No. | Alumina (wt % of inorganic material) A10 | WCA25 | WCA30 | WCA45 |
|---|---|---|---|---|
| C5 | 49.767 | — | — | — |
| C6 | — | 49.767 | — | — |
| C7 | — | — | 49.767 | — |
| C8 | — | — | — | 49.767 |

The resulting alumina titanate-containing ceramic bodies were analyzed. Their properties are set forth in Table 8.

TABLE 8

Properties of Fired Articles Resulting from Batches C5-C8

| Batch No. | Porosity (%) | Pore Size (μm) | d10 | d90 | (d50 − d10)/ d50 | CTE (800) | CTE (1000) | MOR (psi) |
|---|---|---|---|---|---|---|---|---|
| C5 | 32.65 | 7.68 | 1.02 | 15.9 | 0.87 | −3.6 | −1.3 | 514 |
| C6 | 33.46 | 12.72 | 4.50 | 26.35 | 0.65 | −6.1 | −2.4 | 410 |
| C7 | 33.85 | 14.61 | 7.18 | 32.53 | 0.51 | −4.9 | −0.8 | 382 |
| C8 | 33.11 | 13.71 | 8.22 | 31.90 | 0.40 | −1.4 | 2.5 | 377 |

TABLE 9

Particle Size Data for Alumina, Silica, and Pore-Forming Materials

| Material | Particle Size 10% (μm) | 50% (μm) | 90% (μm) | $d_{breadth}$ |
|---|---|---|---|---|
| WCA 20 | 10.4 | 15.3 | 22.7 | 0.8 |
| WCA 25 | 13.4 | 20.4 | 31.9 | 0.9 |
| WCA 30 | 19.1 | 27.9 | 42.2 | 0.8 |
| WCA 45 | 25.9 | 40.0 | 62.5 | 0.9 |
| A-10 | 5.4 | 11.5 | 27.1 | 1.9 |
| Imsil A25 | 1.1 | 4.5 | 17.5 | 3.7 |
| Cerasil 300 | 4.1 | 26.9 | 66.8 | 2.3 |
| Potato Starch | 25.3 | 43.4 | 69.3 | 1.0 |
| Corn Starch | 10.5 | 15.2 | 23.2 | 0.8 |
| Sago Starch | 23.5 | 32.6 | 47.8 | 0.7 |
| Rice Starch | 4.0 | 7.2 | 13.1 | 1.3 |

TABLE 9-continued

Particle Size Data for Alumina, Silica, and Pore-Forming Materials

| Material | Particle Size | | | $d_{breadth}$ |
|---|---|---|---|---|
| | 10% (μm) | 50% (μm) | 90% (μm) | |
| Wheat Starch | 11.2 | 19.2 | 30.1 | 1.0 |
| WSF | 9.4 | 28.9 | 62.9 | 1.9 |
| Graphite 4623 | 17.4 | 42.5 | 82.7 | 1.5 |

Table 10 below reflects the ratio of the median particle diameter of at least 40 volume % of the inorganic materials to the median particle diameter of the at least one pore-forming materials of Batches 1-25 set forth in Examples 1-2 above. For the ratios set forth in Table 10, the median particle diameters of the alumina sources, which comprised more than 40% of the inorganic materials in Batches 1-25, were relied upon for the median particle diameter of the at least 40 volume % of inorganic materials. Although only the alumina particles were relied upon for calculating the ratio of the median particle diameter of at least 40 volume % of the inorganic materials to the median particle diameter of the at least one pore-forming material, the inorganic materials suitable for use in the embodiments described herein are not intended to be limited to alumina sources, but may comprise any inorganic material as defined herein.

TABLE 10

Particle Size Ratios

| Batch No. | Ratio |
|---|---|
| 1 | 1.6 |
| 2 | 1.6 |
| 3 | 1.6 |
| 4 | 0.76 |
| 5 | 0.76 |
| 6 | 0.76 |
| 7 | 1.34 |
| 8 | 1.34 |
| 9 | 1.34 |
| 10 | 0.63 |
| 11 | 0.63 |
| 12 | 0.63 |
| 13 | 0.86 |
| 14 | 0.86 |
| 15 | 0.86 |
| 16 | 0.64 |
| 17 | 0.64 |
| 18 | 0.64 |
| 19 | 0.92 |
| 20 | 0.92 |
| 21 | 0.92 |
| 22 | 1.01 |
| 23 | 1.01 |
| 24 | 0.36 |
| 25 | 0.36 |

What is claimed is:

1. An aluminum titanate-containing ceramic-forming batch material comprising:
    (a) inorganic materials comprising particles from sources of alumina and titania, and
    (b) particles of at least one pore-forming material,
    wherein the ratio of the median particle diameter of at least 40 volume % of the inorganic materials (a) to the median particle diameter of the at least one pore-forming material (b) ranges from 0.3 to 1.0;
    wherein $d_{breadth}$ for the at least 40 volume % of the inorganic materials (a) is less than 1.5; and
    wherein $d_{breadth}$ of the at least one pore-forming material (b) is less than 2.

2. The aluminum titanate-containing ceramic-forming batch material of claim 1, wherein the ratio of the median particle diameter of at least 45 volume % of the inorganic materials (a) to the median particle diameter of the at least one pore-forming material (b) ranges from 0.3 to 1.0;
    wherein $d_{breadth}$ for the at least 45 volume % of the inorganic materials (a) is less than 1.5.

3. The aluminum titanate-containing ceramic-forming batch material of claim 1, wherein the ratio of the median particle diameter of at least 50 volume % of the inorganic materials (a) to the median particle diameter of the at least one pore-forming material (b) ranges from 0.3 to 1.0;
    wherein $d_{breadth}$ for the at least 50 volume % of the inorganic materials (a) is less than 1.5.

4. The aluminum titanate-containing ceramic-forming batch material of claim 1, wherein the ratio of the median particle diameter of at least 40 volume % of the inorganic materials (a) to the median particle diameter of the at least one pore-forming material (b) ranges from 0.5 to 0.8.

5. The aluminum titanate-containing ceramic-forming batch material of claim 1, wherein $d_{breadth}$ for the at least 40 volume % of the inorganic materials (a) is less than 1.

6. The aluminum titanate-containing ceramic-forming batch material of claim 1, wherein $d_{breadth}$ of the at least one pore-forming material (b) is less than 1.5.

7. The aluminum titanate-containing ceramic-forming batch material of claim 1, wherein the inorganic materials (a) further comprise at least one additional material chosen from silica, carbonates, and oxides.

8. The aluminum titanate-containing ceramic-forming batch material of claim 1, wherein the particles of at least one pore-forming material are chosen from particles of rice, corn, sago palm, potato, wheat, bean, walnut shell flour, and graphite.

9. The aluminum titanate-containing ceramic-forming batch material of claim 1, wherein the batch material comprises at least two pore-forming materials.

10. The aluminum titanate-containing ceramic-forming batch material of claim 1, wherein the median particle diameter of the at least one alumina source ranges from 2 μm to 45 μm.

11. The aluminum titanate-containing ceramic-forming batch material of claim 1, wherein the median particle diameter of the at least one pore-forming material ranges from 10 μm to 180 μm.

12. A method of making an aluminum titanate-containing ceramic body comprising:
    preparing batch material comprising:
        (a) inorganic materials comprising particles from sources of alumina and titania, and
        (b) particles of at least one pore-forming material,
    wherein the ratio of the median particle diameter of at least 40 volume % of the inorganic materials (a) to the median particle diameter of the at least one pore-forming material (b) ranges from 0.3 to 1.0;
    wherein $d_{breadth}$ for the at least 40 volume % of the inorganic materials (a) is less than 1.5; and
    wherein $d_{breadth}$ of the at least one pore-forming material (b) is less than 2;
    forming a green body from the batch material; and
    firing the green body to obtain an aluminum titanate-containing ceramic body.

13. The method of claim 12, wherein the porosity of the aluminum titanate-containing ceramic body ranges from 40% to 65%.

14. The method of claim 12, wherein the aluminum titanate-containing ceramic body has a d-factor of 0.45 or less.

15. The method of claim 12, wherein the aluminum titanate-containing ceramic body has a median pore diameter ranging from 8 μm to 35 μm.

16. A method for at least one of improving pore size distribution and controlling pore size of an aluminum titanate-containing ceramic body, said method comprising:
   preparing batch material comprising:
   (a) inorganic materials comprising particles from sources of alumina and titania, and
   (b) particles of at least one pore-forming material,
   wherein the ratio of the median particle diameter of at least 40 volume % of the inorganic materials (a) to the median particle diameter of the at least one pore-forming material (b) ranges from 0.3 to 1.0;
   wherein $d_{breadth}$ for the at least 40 volume % of the inorganic materials (a) is less than 1.5; and
   wherein $d_{breadth}$ of the at least one pore-forming material (b) is less than 2;
   forming a green body from the batch composition; and
   firing the green body to obtain an aluminum titanate-containing ceramic body.

17. The method of claim 16, wherein the porosity of the aluminum titanate-containing ceramic body ranges from 40% to 65%.

18. The method of claim 16, wherein the aluminum titanate-containing ceramic body has a d-factor of 0.45 or less.

19. The method of claim 16, wherein the aluminum titanate-containing ceramic body has a median pore diameter ranging from 8 μm to 35 μm.

* * * * *